United States Patent [19]
Coté

[11] Patent Number: 5,467,908
[45] Date of Patent: Nov. 21, 1995

[54] FLOATING FISH STRINGER

[76] Inventor: Stephane Coté, 1928 Bayonne, Terrebonne, Québec, Canada, J6X 3P2

[21] Appl. No.: 340,723

[22] Filed: Nov. 16, 1994

[51] Int. Cl.⁶ .................................................. A01K 65/00
[52] U.S. Cl. .......................................... 224/103; D22/134
[58] Field of Search ................................. 224/103; 43/55, 43/54.1; D22/134, 146; D21/157; 441/23, 28, 129

[56] References Cited

U.S. PATENT DOCUMENTS

| | | |
|---|---|---|
| 827,855 | 8/1906 | Farmer . |
| 928,427 | 7/1909 | Coleman . |
| 2,424,658 | 7/1947 | Hanson . |
| 2,800,263 | 7/1957 | Hunt . |
| 2,852,173 | 9/1958 | Milner, Sr. .............................. 224/103 |
| 3,137,421 | 6/1964 | Haddock ................................. 224/103 |
| 3,561,652 | 2/1971 | Ruter . |
| 3,783,548 | 1/1974 | Fisher . |
| 4,328,916 | 5/1982 | Lucas . |
| 4,827,661 | 5/1989 | Wendler .................................. 224/103 |
| 4,960,231 | 10/1990 | Popovich . |
| 4,967,697 | 11/1990 | Lau . |
| 5,031,809 | 7/1991 | Roberts et al. . |
| 5,113,614 | 5/1992 | Morita . |
| 5,203,480 | 4/1993 | Day et al. . |

Primary Examiner—Linda J. Sholl
Attorney, Agent, or Firm—Andrus, Sceales, Starke & Sawall

[57] ABSTRACT

Disclosed herein is a fish stringer for underwater maintenance of live captured fish, the fish stringer comprising, in combination: a buoyant element having a generally oblong shape and ballast in its underside, a towing line secured at one end thereof to the buoyant element and to be releasably secured at the opposite end to a watercraft, an angler or a fixed object, a fish stringing line secured at one end thereof to the buoyant element and having a needle element at the other end thereof for threading the fish stringing line through the gills and mouth of captured fish, the fish stringing line extending generally underwater below the buoyant element, and an adjustment structure for adjusting the operational length of the fish stringing line.

10 Claims, 2 Drawing Sheets

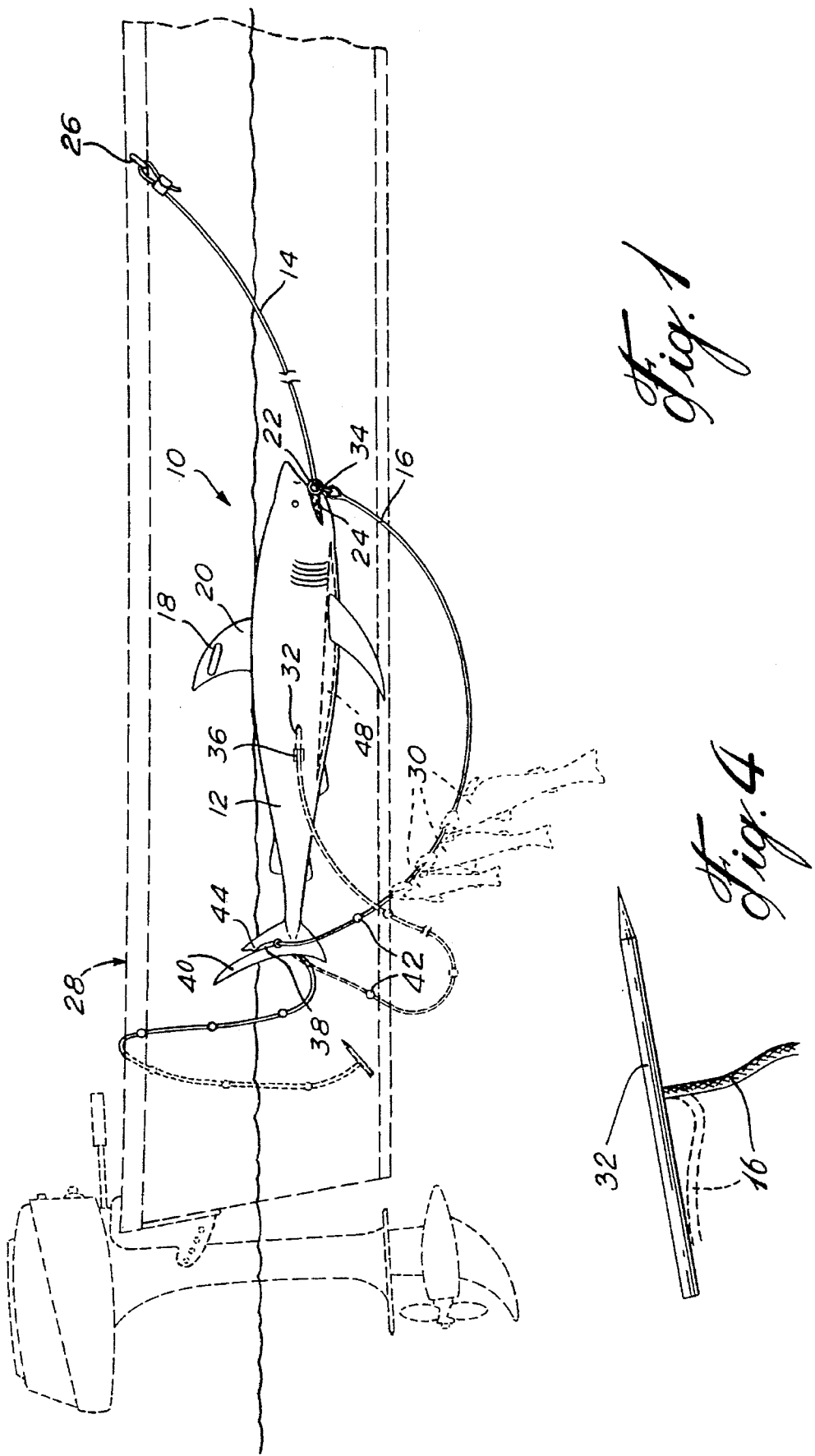

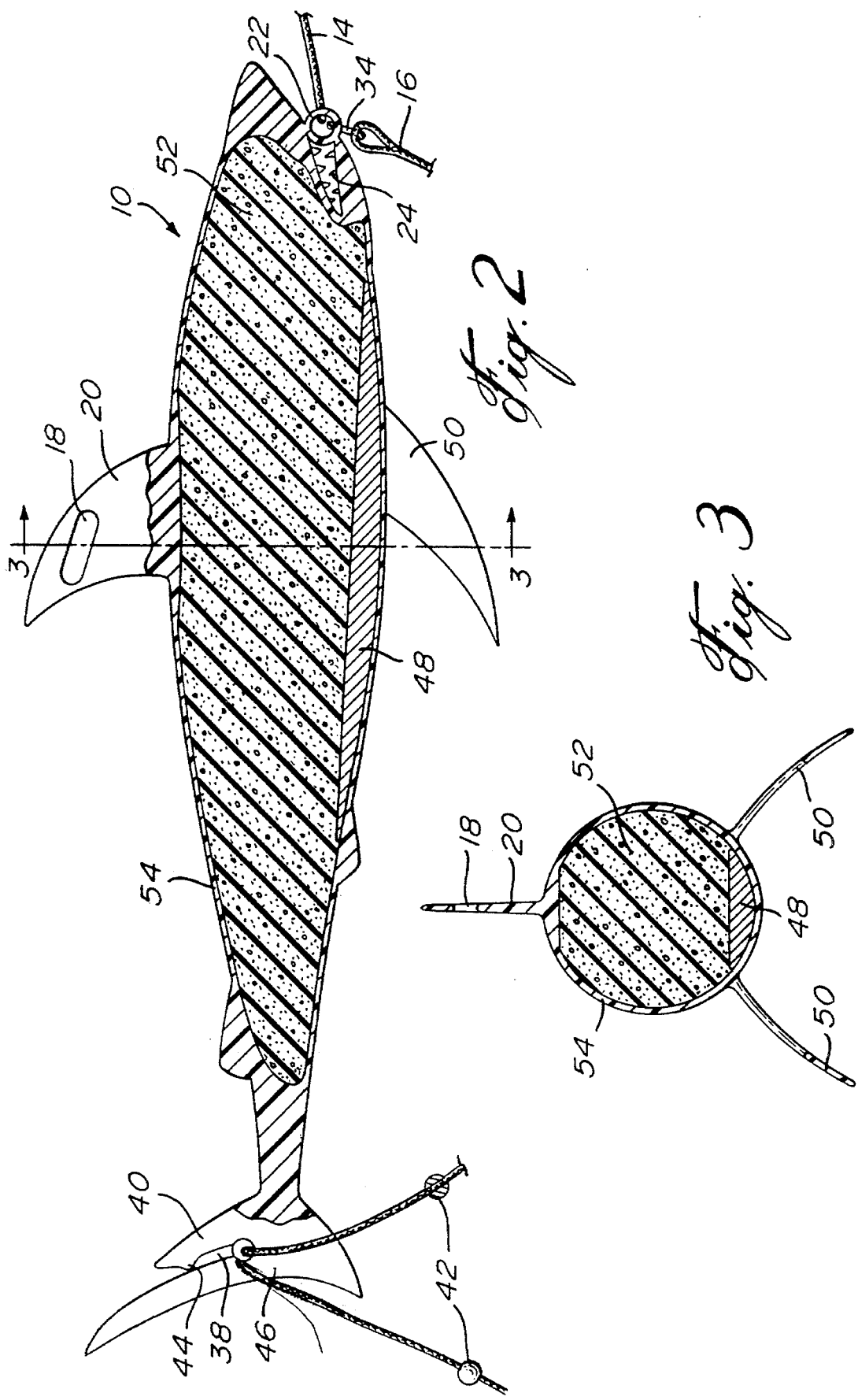

FLOATING FISH STRINGER

BACKGROUND OF THE INVENTION

1. Field of the Invention

The present invention relates to the field of fish stringers used by anglers for the underwater maintenance of live captured fish. More specifically, the present invention concerns a buoyant fish stringer having a fish stringing line of easily adjustable length.

2. Brief Description of the Prior Art

It is well known by anglers to use fish stringers of various configurations to maintain their captured fish underwater in a safe, live and fresh condition while continuing to fish. The fish are threaded through the opening in the gills and out through the mouth. It is common to thread each fish separately on a safety pin hook or to thread all fish on a common line. Currently, the prior art discloses a wide variety of fish stringing devices. All are different from the present invention and fail to provide its unique advantages. Typical examples of pertinent prior art but which differs from the present invention are found in the following U.S. Patents:

| U.S. Pat. No. | ISSUED | INVENTOR(S) |
| --- | --- | --- |
| 827,855 | AUG. 7, 1906 | FARMER |
| 2,424,658 | APR. 17, 1946 | HANSON |
| 3,561,652 | FEB. 9, 1971 | RUTER |
| 4,328,916 | MAY 11, 1982 | LUCAS |
| 5,031,809 | JUL. 16, 1991 | ROBERTS et al. |
| 5,203,480 | APR. 20, 1993 | DAY et al. |

Farmer discloses a fish stringer and handle combination aiming to avoid the liability of a long string of fish trailing on the ground when carried out of the water. The handle is provided with hooks so that the fish string may be folded over so that its trailing length is reduced.

Ruter unveils a floating fish stringer. A conventional fish stringing chain having conventional spaced apart safety pin hooks is also provided with flotation units in case the fish stringer would be accidentally dropped.

Lucas also divulges a floating fish stringer. His device consists of a floating ring with conventional safety pin hooks radially disposed on the ring and a tow line attached to the middle of the ring.

Roberts et al. for their part show a fish string line where the conventional needle end is replaced with a small looped end. The small looped end can fit through the gills and mouth of a caught fish and then be secured to a conventional releasable hook such as a snap hook.

Day et al. disclose a floating D-shaped fish stringer handle comprising a conventional string line having a needle at one end and a fish retaining stopper at the other end. The string line can be wound in a groove around the handle so that its length may be adjusted at will. However one important drawback is that each time a caught fish is strung, all of the fish string must be unwound from the handle and rewound to an appropriate length.

As illustrated by the great number of prior art patents, efforts are continuously being made to provide improved fish stringer systems which are reliable and easy to use and manufacture. However noteworthy to one extent or another, none of the previous efforts can provide the unique benefits conferred by the present invention.

SUMMARY OF THE INVENTION

The invention provides a fish stringer for underwater maintenance of live captured fish, the fish stringer comprising, in combination:

a buoyant element having a generally oblong shape and ballast in its underside, a towing line secured at one end thereof to the buoyant element and to be releasably secured at the opposite end to a watercraft, an angler or a fixed object, a fish stringing line secured at one end thereof to the buoyant element and having a needle element at the other end thereof for threading the fish stringing line through the gills and mouth of captured fish, the fish stringing line extending generally underwater below the buoyant element, adjustment means for adjusting the operational length of the fish stringing line, the operational length consisting of the length of fish stringing line along which the captured fish may travel, the adjustment means comprising:

a narrow slot on the buoyant element, a plurality of spaced apart protuberances on the fish stringing line, the protuberances being shaped and dimensioned to easily pass through the gills and mouth of captured fish, wherein the fish stringing line may be inserted crosswise and may be longitudinally slidable in the slot in a range of displacement corresponding to the space on the fish stringing line between successive protuberances, wherein the protuberances are larger than the slot and will prevent the fish stringing line from being be longitudinally slid past any of the protuberances;

wherein during use, as more fish are captured by an angler and threaded by the gills and mouth on the fish stringing line, the operational length of the fish stringing line may be readily adjusted by placing the fish stringing line crosswise in the slot between any chosen protuberances on the fish stringing line, whereby the protuberances will constitute operational length delimiters.

In one embodiment, the invention provides a fish stringer for underwater maintenance of live captured fish, the fish stringer comprising, in combination:

a buoyant element having the shape of a fish comprising a caudal fin and at least one dorsal fin, the fish-shaped buoyant element having ballast in its underside, handle means formed in at least one of the dorsal fins of the fish-shaped buoyant element, for grasping with a hand when pulling the buoyant element out of a body of water, a towing line secured at one end thereof to the buoyant element and to be releasably secured at the opposite end to a watercraft, an angler or a dock, a fish stringing line secured at one end thereof to the buoyant element and having a needle element at the other end thereof for threading the fish stringing line through the gills and mouth of captured fish, the fish stringing line extending generally underwater below the buoyant element, adjustment means for adjusting the operational length of the fish stringing line, the operational length consisting of the length of fish stringing line along which the captured fish may travel, the adjustment means comprising:

a narrow slot in the caudal fin of the fish-shaped buoyant element, a plurality of spaced apart protuberances on the fish stringing line, the protuberances being shaped and dimensioned to easily pass through the gills and mouth of captured fish, wherein the fish stringing line may be inserted crosswise and may be longitudinally slidable in the slot in a range of displacement corresponding to the space on the fish stringing line between successive protuberances, wherein the protuberances are larger than the slot and will prevent the fish stringing line from being be longitudinally slid past any of the protuberances; wherein during use, as more fish are captured by an angler and threaded by the gills and mouth on the fish stringing line, the operational length of the fish stringing line may be readily adjusted by placing the fish stringing line crosswise in the slot between any chosen protuberances on the fish stringing line, whereby the protuberances will constitute operational length delimiters.

In a preferred embodiment, the oblong buoyant element is made of molded plastic in the shape of a shark. The fish stringing line is retained in a slot in the shark's caudal fin. The tow line is connected to the shark's mouth. A handle is opened-up in the shark's dorsal fin.

Numerous advantages flow from the device of the present invention. Some of these advantages may be itemized as follows:

- the portion of the fish string holding the captured fish can remain in the water while other fish are being added to the string;
- the device can be easily used while wearing gloves;
- the operational length of the fish stringing line is easily adjustable with only one hand;
- the fish stringer can be easily removed from the water because of the handle on the buoyant element;
- the fish stringer is lightweight;
- in areas where catches are limited, the number of fish caught is very easy to count since the fish are threaded side by side;
- because the fish stringer is buoyant it cannot accidentally sink to the bottom of the water;
- in operation, it is silent and will not cause metallic noises which occurs when fish chains are used;
- the captured fish have a good range of movement which helps to maintain them fresher longer;
- the threading needle is easily accessible without having to immerse one's hand in the water or to lift the fish stringer out of the water;
- the threading needle design is much easier to use than the safety pin type of hooks found on many current models of fish stringers;
- the fish stringer made be entirely made of thermoplastic materials thereby completely avoiding corrosion problems usually encountered with other fish stringers.

Other features and advantages of the invention will become apparent to those of ordinary skill in the art upon review of the following detailed description, claims, and drawings.

BRIEF DESCRIPTION OF THE DRAWINGS

FIG. 1 is a schematic illustration of a preferred embodiment of the fish stringer of the present invention, in operation behind a small fishing boat shown in dotted lines;

FIG. 2 is a partial and longitudinal cross-sectional view of the preferred embodiment of FIG. 1;

FIG. 3 is a transverse cross-sectional view taken along line 3—3 of FIG. 2;

FIG. 4 is an isolated side view of a preferred embodiment of a fish stringing needle.

DETAILED DESCRIPTION OF A PROFFERED EMBODIMENT

Referring to FIG. 1, there is shown a fish stringer 10 which includes a representation of a shark 12, a tow line 14 and a length adjustable fish string 16. Shark 12 is buoyant and is provided with a handle portion 18 on its first dorsal fin 20 to allow the shark 12 to be easily grasped by the hand when deposited or removed from the water or when carried over land. A loop 22 is fixedly mounted or integrally formed in mouth opening 24 of shark 12. Loop 22 allows the attachment thereon of tow line 14 and fish string 16. In operation, shark 12 is partially immersed underwater and pulled by a tow line 12. For example, the tow line 12 can be secured by means of a knot to the gunwale 26 of a small boat 28 (shown in dotted lines) which pulls fish stringer 10.

Captured fish 30 are maintained in a live and fresh condition by threading them by the gills and mouth to fish string 16. Fish string 16 has a threading needle end 32 and a releasable clamp end 34 which clamps onto loop 22. FIG. 4 shows an isolated view of a preferred embodiment of how fish string 16 is connected to needle 32. Fish string 16 is connected to needle 32 approximately at the longitudinal midpoint of needle 32. With such arrangement, fish string 16 may be bent back alongside needle 32 during the stringing process. This will prevent fish 30 from escaping even if the end of fish string 16 was accidentally dropped in the water. Between uses of the fish stringer, needle 32 is maintained by releasable snap fit in a resiliently deformable needle holder 36 provided on the exterior side of shark 12.

The operational length of fish string 16 which consists of the length of fish string 16 along which the captured fish may travel can be adjusted at will depending on the number of fish held at any one time on fish string 16. The devices which permit adjustment of the operational length of fish string 16 comprise: a narrow slot 38 on caudal fin 40 of shark 12, and a plurality of spaced apart protuberances 42 on the fish string 16, the protuberances being shaped and dimensioned to easily pass through the gills and mouth of captured fish. Referring also to FIG. 2, it is shown how the fish string 16 may be inserted crosswise in slot 38 and may be longitudinally slidable in the slot 38 in a range of displacement corresponding to the space on the fish string 16 between successive protuberances 42, wherein protuberances 42 are larger than slot 38 and will prevent the fish string 16 from being be longitudinally slid past any of the protuberances 42. Slot 38 may also be advantageously provided with a narrower portion 44 to prevent accidental removal of fish string 16 from slot 38. The rear portion 46 of caudal fin 40 may be slightly deformable and resilient to allow temporary widening of narrower portion 44 to allow passage of fish string 16 to the bottom of slot 38.

During use of fish stringer 10, as more fish are captured by an angler and threaded by the gills and mouth on fish string 16, the operational length of the fish string 16 may therefore be readily adjusted by placing the fish string 16 crosswise in slot 38 between any chosen protuberances 42 on fish string 16. The protuberances 42 will constitute operational length delimiters.

Referring to FIGS. 2 and 3, it is shown that shark 12 is provided with ballast 48 in its underside. The role of ballast 48 is to improve stability of shark 12 as it is dragged in the water by tow line 14. The ballast 16 will effectively avoid tipping over of shark 12 even in choppy waters. Also to improve hydrodynamic stability, shark 12 is provided with a pair of pectoral fins 50 projecting from both sides of shark 12.

Shark 12 can be manufactured from any buoyant material. In a preferred embodiment, shark 12 is made from an inner core of foam material 52 with a denser and heavier material for ballast 48. The outer core 54 of shark 12 is preferably made from a thermoplastic material unaffected by salt water, rot or mildew. Tow line 14 and fish string 16 can be made of any suitable material such as, for example, nylon rope or plastic coated metal wire. Protuberances 42 can be also made from any suitable material such as plastic or metal. If required, the entire fish stringer 10 can be made of plastic material thereby avoiding any corrosion problems.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. A fish stringer for underwater maintenance of live captured fish, said fish stringer comprising, in combination:
   a buoyant element having a generally oblong shape and ballast in its underside,
   a towing line secured at one end thereof to said buoyant element and to be releasably secured at the opposite end to a watercraft, an angler or a fixed object,
   a fish stringing line secured at one end thereof to said buoyant element and having a needle element at the other end thereof for threading said fish stringing line through the gills and mouth of captured fish, said fish stringing line extending generally underwater below said buoyant element,
   adjustment means for adjusting the operational length of said fish stringing line, said operational length consisting of the length of fish stringing line along which said captured fish may travel, said adjustment means comprising:
      a narrow slot on said buoyant element,
      a plurality of spaced apart protuberances on said fish stringing line, said protuberances being shaped and dimensioned to easily pass through the gills and mouth of captured fish, wherein said fish stringing line may be inserted crosswise and may be longitudinally slidable in said slot in a range of displacement corresponding to the space on said fish stringing line between successive protuberances, wherein said protuberances are larger than said slot and will prevent said fish stringing line from being be longitudinally slid past any of said protuberances;
   wherein during use, as more fish are captured by an angler and threaded by the gills and mouth on said fish stringing line, the operational length of said fish stringing line may be readily adjusted by placing said fish stringing line crosswise in said slot between any chosen protuberances on said fish stringing line, whereby said protuberances will constitute operational length delimiters.

2. The fish stringer of claim 1 wherein said slot comprises narrower portions which are capable of being resiliently widened to allow crosswise insertion and snap fitting of said fish stringing line in said slot.

3. The fish stringer of claim 1 wherein said buoyant element further comprises handle means, projecting upwardly from the top of said buoyant element, for grasping with a hand when pulling the buoyant element out of a body of water.

4. The fish stringer of claim 3 wherein said buoyant element is in the shape of a fish comprising a caudal fin.

5. The fish stringer of claim 4 wherein said slot is cut in the caudal fin of said fish.

6. The fish stringer of claim 5 further comprising a bore in the top dorsal portion of said fish for receiving said needle element in a releasable friction fit.

7. The fish stringer of claim 5 wherein said needle element comprises two pivotable portions resiliently urged by a camed surface into a T-shape position for preventing the escape of captured fish once threaded onto said fish stringing line or a co-alignment position for threading captured fish onto said fish stringing line.

8. The fish stringer of claim 5 wherein said buoyant element is in the shape of a shark having a dorsal fin.

9. The fish stringer of claim 8 wherein said handle means is formed in the dorsal fin of said shark.

10. A fish stringer for underwater maintenance of live captured fish, said fish stringer comprising, in combination:
    a buoyant element having the shape of a fish comprising a caudal fin and at least one dorsal fin, said fish-shaped buoyant element having ballast in its underside, handle means formed in at least one of said dorsal fins of said fish-shaped buoyant element, for grasping with a hand when pulling the buoyant element out of a body of water,
    a towing line secured at one end thereof to said buoyant element and to be releasably secured at the opposite end to a watercraft, an angler or a dock,
    a fish stringing line secured at one end thereof to said buoyant element and having a needle element at the other end thereof for threading said fish stringing line through the gills and mouth of captured fish, said fish stringing line extending generally underwater below said buoyant element,
    adjustment means for adjusting the operational length of said fish stringing line, said operational length consisting of the length of fish stringing line along which said captured fish may travel, said adjustment means comprising:
       a narrow slot in the caudal fin of said fish-shaped buoyant element,
       a plurality of spaced apart protuberances on said fish stringing line, said protuberances being shaped and dimensioned to easily pass through the gills and mouth of captured fish, wherein said fish stringing line may be inserted crosswise and may be longitudinally slidable in said slot in a range of displacement corresponding to the space on said fish stringing line between successive protuberances, wherein said protuberances are larger than said slot and will prevent said fish stringing line from being be longitudinally slid past any of said protuberances;
    wherein during use, as more fish are captured by an angler and threaded by the gills and mouth on said fish stringing line, the operational length of said fish stringing line may be readily adjusted by placing said fish stringing line crosswise in said slot between any chosen protuberances on said fish stringing line, whereby said protuberances will constitute operational length delimiters.

* * * * *